United States Patent [19]

Roebke et al.

[11] 4,073,867

[45] Feb. 14, 1978

[54] PROCESS FOR THE PRODUCTION OF CRYSTALLINE ZEOLITIC MOLECULAR SIEVES OF TYPE A

[75] Inventors: Wolfgang Roebke, Altenstadt; Dieter Kneitel; Erfried Parr, both of Rodenbach, all of Germany

[73] Assignees: Deutsche Gold- und Silber-Scheideanstalt vormals Roessler, Frankfurt; Henkel u. Cie GmbH, Dusseldorf-Holthausen, both of Germany

[21] Appl. No.: 671,950

[22] Filed: Mar. 30, 1976

[30] Foreign Application Priority Data

Apr. 18, 1975 Germany .............................. 2517218

[51] Int. Cl.$^2$ ............................................. C01B 33/28
[52] U.S. Cl. ................... 423/429; 252/131; 252/135; 423/328; 106/288 B
[58] Field of Search .................. 423/328, 329, 330; 106/288 B; 252/455 Z, 89, 131

[56] References Cited

U.S. PATENT DOCUMENTS

| 2,882,243 | 4/1959 | Milton | 423/328 |
| 2,982,612 | 5/1961 | Barrer et al. | 423/329 |
| 3,433,588 | 3/1969 | Michel et al. | 423/329 |
| 3,985,669 | 10/1976 | Krummel | 252/131 X |

FOREIGN PATENT DOCUMENTS 1,232,429   5/1971   United Kingdom ................ 423/329

OTHER PUBLICATIONS

Sotirova et al., "Chemical Abstracts", vol. 77, 1972, 77363t.

Primary Examiner—Edward J. Meros
Attorney, Agent, or Firm—Cushman, Darby & Cushman

[57] ABSTRACT

A crystalline zeolitic molecular sieve of Type A with the composition $1.0 \pm 0.2\ M_{2/n}O : Al_2O_3 : 1.85 \pm 0.5\ SiO_2 \cdot y\ H_2O$ where M is a metal cation, n its valence and y has a value up to 6 is prepared having particles with at least 99.5 weight % below $30\mu$ diameter, as well as at least 90 weight % under $10\mu$ and with 50 weight % below $6.5\mu$ by hydrothermal crystallization of an alkali-aluminate silicate by pouring together an aqueous alkali silicate solution and a slightly concentrated aqueous alkali aluminate liquor, in a given case with simultaneous stirring in a receiver, allowing the synthesis premixture to solidify to a gel, adding to this gel a more highly concentrated aqueous alkali aluminate liquor at a temperature between 10° and 100° C while stirring, allowing the thus obtained synthesis mixture to crystallize at a temperature between 20° and 175° C, preferably 100° C, within 15 minutes and in a given case including a tempering step.

10 Claims, No Drawings

PROCESS FOR THE PRODUCTION OF CRYSTALLINE ZEOLITIC MOLECULAR SIEVES OF TYPE A

The invention concerns a process for the production of a crystalline zeolitic molecular sieve of Type A with the composition $$1.0 \pm 0.2\ M_{2/n}O : Al_2O_3 : 1.85 \pm 0.5\ SiO_2 \cdot y\ H_2O$$

where M is a metal cation, e.g., sodium, potassium, lithium or calcium, $n$ is its valence and $y$ has a value up to 6. The particles of the molecular sieve have at least 99.5 weight % with a diameter below $30\mu$, as well as at least 90.0 weight % with a diameter below $10\mu$ and at least 50 weight % with a diameter below a maximum of $6.5\mu$ and are prepared by means of a hydrothermal crystallization of an alkali-aluminate-silicate mixture as well as the alkali aluminum silicates obtained by the process and their use.

Zeolitic molecular sieves and their specific properties for ion exchange and adsorption have been known for a long time. Thus reference is made to Breck, *Zeolite Molecular Sieves*, John Wiley & Sons, New York, N.Y., 1974. The entire disclosure of Breck is hereby incorporated by reference as background material.

The synthesis of the zeolitic molecular sieves depends on heating an aqueous mixture with the composition a $Na_2O \times b\ Al_2O_3 \times c\ SiO_2$ to temperatures between 50° and 300° C. According to the composition of the starting mixture, reaction temperature and reaction time there are obtained different structured compounds of the general formula $Na_xAl_xSi_yO_{2(x+y)} \cdot y\ H_2O$ which are distinguishable based on their X-ray spectra. Thereby, sodium can be replaced by other mono or divalent metal cations, e.g., potassium, lithium, calcium, strontium or barium.

Thus, for example, there is shown in Milton German Pat. No. 1,038,017 and U.S. Pat. No. 2,882,243 a process for the product of molecular sieve A with the summation formula $1.0 \pm 0.2\ M_{2/n}O : Al_2O_3 : 1.85 \pm 0.5\ SiO_2 : y\ H_2O$ wherein M is a metal cation, $n$ its valence and $y$ has a value up to 6. The entire disclosures of the Milton patents are incorporated by reference.

For use as adsorption agents, catalyst carriers or ion exchangers the molecular sieves are converted into molded articles with a suitable binder. The production of the molded article means a great industrial expense with simultaneous reduction of the effect because of the binder component. Also, because of the long diffusion path, the reaction speed is greatly retarded, which, e.g., makes cumbersome the drying of organic liquids. It is, therefore, significant to add molecular sieve powders in many uses.

The known processes of production (e.g., Milton German Pat. No. 1,038,017 and Milton U.S. Pat. No. 2,882,243) have in common that crystals are obtained in the molecular sieve synthesis whose average diameter is above about $2\mu$, whereby a considerable portion, customarily between 3 and 12 weight % have a border grain (limiting particle) diameter above $45\mu$. This portion is designated grit; it is ascertained by DIN 53580 (German Industrial Standard 53580) by wet sieving according to Mocker. In a typical product for this process, it has been ascertained that about 25 weight % of the particles have a diameter below $10\mu$, 50 weight % have a particle diameter below $13\mu$ (D. W. Breck, *Zeolite Molecular Sieves*, page 388 (1974)).

The invention is based on the problem of creating a process of synthesizing and providing a powdery zeolitic molecular sieve of Type A having a smaller particle size without formation of grit components (particles $>45\mu$), which molecular sieve is especially useful as an ion exchange, e.g., for water softening. The absence of grit as well as a smaller particle size is indispensable for a number of uses within the invention, e.g., use of such molecular sieves, e.g., as phosphate replacements in washing, rinsing and cleansing, processes. Washing, rinsing and cleansing processes, especially in machines, imply indeed a lasting suspension of the molecular sieve (as a result of a slight tendency for quiescent setting) in the liquor in order to make possible a residue free rinsing after completion of the process.

The object of the invention is the development of a process for the production of a crystalline zeolitic molecular sieve of Type A with the composition $1.0 \pm 0.2\ M_{2/n}O : Al_2O_3 : 1.85 \pm 0.5\ SiO_2 \cdot y\ H_2O$ where M is a metal cation, $n$ its valence and $y$ has a value up to 6 having particles with at least 99.5 weight % below $30\mu$ diameter, as well as at least 90 weight % under $10\mu$ and with 50 weight % below $6.5\mu$ by hydrothermal crystallization of an alkali-aluminate silicate by pouring together an aqueous alkali silicate solution and a slightly concentrated aqueous alkali aluminate liquor, in a given case with simultaneous stirring in a receiver, allowing the synthesis premixture to solidify to a gel, adding to this gel a more highly concentrated aqueous alkali aluminate liquor at a temperature between 10° and 100° C with stirring, allowing the thus obtained synthesis mixture to crystallize at a temperature between 20° and 175° C, preferably 100° C., within 15 minutes and in a given case including a tempering step.

The alkali can be sodium, potassium, or lithium.

According to the invention, there is used as a receiver an aqueous alkali liquor, e.g., aqueous sodium hydroxide which can have a concentration of 0.1 to 500 grams NaOH/liter. As the low concentrated alkali aluminate liquor there can be used a sodium aluminate liquor which can contain 1 to 100 grams $Al_2O_3/l$, for example, 25 grams $Al_2O_3/l$, more preferably 20 and most preferably 15 grams $Al_2O_3/l$ and 10 to 200 grams $Na_2O/l$. Under the concept, low concentrated alkali aluminate liquor, there is intended a liquor which contains at most 75 weight %, preferably, however, less than 50 weight % of the amount of $Al_2O_3$. $H_2O$ soluble at a given $Na_2O$ content.

In the thus obtained synthesis premixture the components can be present in the following molar ratios $SiO_2/Al_2O_3 = 30:1$
$Na_2O/SiO_2 = 0.5:1$
$H_2O/Na_2O = 40:1$ If these values are drawn in a three dimentional coordinate system whose axes are perpendicular to each other there is obtained a parallelepiped shaped body which embraces possible molar ratios for the synthesis premixture of the invention, if one corner of the parallelepiped lies in the zero point of the coordinate system.

The process of the invention, however, is not limited to this range in the molar ratios of the synthesis premixture. Thus the ratio $SiO_2/Al_2O_3$ can take any desired value, whose lowest limit, however, is 3.4, whereby it is the more favorable for the formation of the sols the more the amount of $SiO_2$ outweighs the amount of $Al_2O_3$.

The value for the $SiO_2/Al_2O_3$ ratio can thus just as well be between 30 and 40:1, as between 3.4 and 40:1 as between 40 and 50:1.

The ratio $H_2O/Na_2O$ likewise can have any desired value, whereby a preferred value can be between 4 and 300:1 4 and 200:1, 4 and 100:1, 4 and 40:1, 4 and 20:1, or between 20 and 40:1.

The ratio $Na_2O/SiO_2$ can be any desired value between 0.2 and 20:1. Preferably, this value can be between 0.2 and 0.5:1.

The molar ratios of the synthesis mixture used according to the invention thus are found in a three-dimensional coordinate system in the parallelepiped which is bounded by the zero point and the values $SiO_2/Al_2O_3 = 50:1$, $Na_2O/SiO_2 = 20:1$ and $H_2O/Na_2O = 300:1$.

As the higher concentrated alkali aluminate liquor, there can be used a sodium aluminate liquor which contains 0.5 to 200 grams $Al_2O_3/l$, preferably 0.5 to 150 grams $Al_2O_3/l$ and 0.5 to 250 grams $Na_2O/l$.

Instead of stirrers there can be used in the process of the invention shearing forces, for which purpose known apparatuses can be employed. These known procedures increase the particle fineness, but are not necessary for carrying out the process of the invention.

The synthesis mixture arising by the addition of a higher concentrated alkali aluminate liquor can contain the individual components in the molar ratios which are used in the known processes. Such known processes are described in Milton German Pat. No. 1,038,017, Milton U.S. Pat. No. 2,882,243 and Weber German Auslegeschrift 1,095,795. Thus, the Weber Auslegeschrift shows molar ratios of $Na_2O$ $Al_2O_3$ of from 2 to 4:1.

In the process of the invention during the crystallization and during the in a given case subsequent tempering step shearing forces can act on the synthesis mixture.

Under the term "shear" as is used in the present case, are all mechanical stresses causing comminution of discrete particles found in the suspension, which rest predominantly on true shearing action. The shearing can be carried out discontinuously or continuously.

As the shearing apparatus there is preferred a turbine stirrer, for example, the EKATO turbine stirrer. However, there can also be used crown gear dissolvers, dispersing pumps, centrifugal pumps and other apparatus for the shearing.

While the crystallization in the present case, for example, can be carried out at 90° C., it has proven advantageous to carry out the tempering in the crystallization mother liquor at a temperature betweem 85° and 105° C., whereby the time of tempering is advantageously between 0.2 to 6, most favorably 0.8 to 1.0, particularly 1 hour.

While crystallization is preferably carried out at 93° C. this temperature can be varied, e.g., between 90° and 100° C.

The tempering time begins at the point at which the crystallization is finished. This is recognizable by the development of maximum ion exchange power, the reaching of maximum X-ray line intensity and the production of about 22.5% water vapor absorption. In practice a foundation is laid based on empirical values determined by optimization of a recipe.

A shearing influence up to the end of the crystallization phase can be so intensified that the average particle diameter can be reduced to a very low value. Thereby the value for the limiting particle and its percentage in the product likewise is reduced. However, shearing carried out during the tempering step has exclusive influence on the limiting particle and its portion of all of the particles.

The invention extends further to a zeolitic molecular sieve of Type A with at least 99.5 weight % below $30\mu$ as well at least 90% below $10\mu$ and 50 weight % of the particles below a maximum of $6.5\mu$ and a particle spectrum containing

| Fraction ($\mu$) | Portion (weight %) |
|---|---|
| <5 | <35 |
| <10 | <93 |
| <15 | <97 |
| <20 | <98 |
| preferably | |
| Fraction ($\mu$) | Portion (weight %) |
| <5 | 25 – 35 |
| <10 | 90 – 93 |
| <15 | 91 – 97 |
| <20 | 93 – 98 | which is obtained by the described process conditions.

Finally the invention concerns the use of the zeolitic molecular sieves of Type A, obtainable by the process of the invention, as ion exchangers, e.g., for water softening, particularly as phosphate substitutes in washing, rinsing and cleansing agents.

Such washing agents are combinations of surface active washing materials, but for the most part also contain other, predominantly inorganic additives which contribute to the washing result or are necessary for the process of production and the outer product quality. Depending on the intended use, the composition of the washing agent is varied, it depends on the type of fiber, dyeing and washing temperature, as well as apart therefrom whether the washing is by hand, e.g., in a kettle, in a home washing machine, or in a laundry. Most washing agents are pourable powders. However, there are also liquid and pastry products (see Ullmann's *Encyklopadie der technischen Chemie,* 3rd Edition, Vol. 18, Urban & Schwarzenberg, Munich, 1967).

The zeolitic molecular sieves of type produced by the invention has the advantage that it is already produced in grit-free form and contains smaller particles. Therefore, when it is used as a phosphate substitute in washing and cleansing agents, it can be easily held in suspension in the liquor employed, as well as particularly easily rinsed from washing and cleansing machines and their loads.

Unless otherwise indicated, all parts and percentages are by weight.

The invention process is further explained in connection with the following examples.

I. PRODUCTION OF ZEOLITIC MOLECULAR SIEVES

EXAMPLE 1

There were present in a $2m^3$ tank 50 liters of aqueous sodium hydroxide having a content of 60 grams/l of $Na_2O$.

Simultaneously there were dosed into the sodium hydroxide liquor at room temperature with stirring at a speed of 5 liters/min. 125 liters of waterglass solution which contained 26.5 weight % $SiO_2$ and 8 weight %

Na$_2$O, and 125 liters of sodium aluminate liquor which contained 60 grams of Na$_2$O/l and 20 grams of Al$_2$O$_3$/l.

After a short time (about ½ hour), there was formed a gel from the initially clear solution. To the gel there were added with stirring 900 liters of hot sodium aluminate liquor having a temperature of 80° C., which contained 100 kg of commercial aluminum oxide hydrate ("moist hydrate") with a water content of 42.5 weight % and 92 kg of NaOH. The reaction mixture was allowed to crystallize at 93° C. for 3.5 hours. The crystalline product was X-ray graphically pure Zeolite A having the following particle spectrum.

| Fraction (μ) | Portion (weight %) |
|---|---|
| <5 | 25 |
| <10 | 93 |
| <15 | 97 |
| <20 | 98 | whereby 50 weight % had a particle size below 6.5μ.

To determine the particle spectrum in all of the examples, there was used a sedimentation balance of the Sartorius-balance type.

EXAMPLE 2

There were present in a 2m$^3$ tank 50 liters of aqueous sodium hydroxide having a content of 60 grams/l of Na$_2$O.

Simultaneously there were dosed into the sodium hydroxide liquor at room temperature with stirring at a speed of 5 liters/min. 120 liters of waterglass solution which contained 26.5 weight % SiO$_2$ and 8 weight % Na$_2$O and 110 liters of sodium aluminate liquor which contained 60 grams of Na$_2$O/l and 30 grams of Al$_2$O$_3$/l.

After a short time (about ½ hour), there was formed a gel from the initially clear solution. To the gel there were added with stirring 900 liters of hot sodium aluminate liquor having a temperature of 80° C., which contained 150 kg of commercial aluminum oxide hydrate ("moist hydrate") with a water content of 42.5 weight % and 138 kg of NaOH. The reaction mixture was allowed to crystallize at 93° C. for 3.5 hours and contained as the crystalline produce X-ray graphically pure Zeolite A. The white powder had the following particle spectrum:

| Fraction (μ) | Portion (weight %) |
|---|---|
| <5 | 35 |
| <10 | 91 |
| <15 | 95 |
| <20 | 96 | whereby 50 weight % had a particle size below 6μ.

EXAMPLE 3

There were simultaneously dosed at a velocity of 100 ml/min. into a 1 liter round-bottomed flask while stirring with a Heidolph stirrer 85 ml of waterglass solution which contained 26.5 weight % of SiO$_2$ and 8 weight % of Na$_2$O and 85 ml of sodium aluminate liquor which contained 60 grams of Na$_2$O/l and 20 grams of Al$_2$O$_3$/l.

After a short time there was formed a gel.

To this gel there were added with stirring at room temperature a sodium aluminate liquor which contained 70 grams of commercial aluminum oxide hydrate ("moist hydrate") with a water content of 42.5 weight %, 63 grams of NaOH and 300 ml of water.

The reaction mixture formed was heated to 93° to 95° C and held at this temperature for 2 hours for crystallization. The crystalline product obtained was X-ray graphically pure Zeolite A and had the following particle spectrum.

| Fraction (μ) | Portion (weight %) |
|---|---|
| <5 | 35 |
| <10 | 90 |
| <15 | 92 |
| <20 | 94 | whereby there was present a portion of 50 weight % below 6.3μ particle size.

EXAMPLE 4

There were simultaneously dosed at a velocity of 100 ml/min. into a 1 liter round bottomed flask which had present therein 55 grams of 6% aqueous sodium hydroxide while stirring with a Heidolph stirrer 128 ml of waterglass solution which contained 26.5 weight % of SiO$_2$ and 8 weight % of Na$_2$O and 128 ml of sodium aluminate liquor which contained 10 grams of Na$_2$O/l and 3 grams Al$_2$O$_3$/l. After a short time there was formed a gel from the first clear solution.

To this gel there were added with stirring at room temperature a sodium aluminate liquor which contained 100 grams of commercial aluminum oxide hydrate ("moist hydrate") with a water content of 42.5 weight %, 94.5 grams of NaOH and 300 ml of water.

The reaction mixture formed was heated to 93° to 95° C. and held at this temperature for 2 hours for crystallization. The crystalline product obtained was X-ray graphically pure Zeolite A and had the following particle spectrum.

| Fraction (μ) | Portion (weight %) |
|---|---|
| <5 | 32 |
| <10 | 90 |
| <15 | 91 |
| <20 | 93 | whereby there was present a portion of 50 weight % below 6.5μ particle size.

II. THE USE OF THE ZEOLITIC MOLECULAR SIEVES PRODUCED BY THE INVENTION

EXAMPLE 5

| Perborate Containing Washing Agent | |
|---|---|
| Sodium aluminum slicate obtained according to any one of examples 1 to 4 (dried for 6 hours at 90° C., water content 16.8 weight %) | 45.0 |
| Sodium perborate | 20.0 |
| Washing agent powder | 35.0 |

The washing agent powder was produced for example by hot drying the following compositions:

| | |
|---|---|
| ABS (sodium dodecylbenzenesulfonate) | 21.0 % |
| Ethoxylated tallow alcohol (1 mole tallow alcohol + 14 moles ethylene oxide) | 7.5 |
| Soap (sodium salt of saturated, essentially C$_{18}$-C$_{22}$ fatty acids) | 7.2 |
| Waterglass (Na$_2$O . 3 . 3SiO$_2$) | 9.0 |
| Magnesium sulfate | 4.5 |
| Carboxymethyl cellulose | 2.0 |
| Optical brightener | 0.6 |
| Soluble complex (e.g., sodium citrate, | |

-continued

| | |
|---|---|
| or nitrilotriacetic acid (NTA), or ethylene diamine tetraacetic acid (EDTA), or sodium triphosphate, or POC, etc.) | 9.0 |
| Sodium sulfate | 35.0 |
| Water | Balance |

The washing agent was produced by mixing the three powdery constituents.

EXAMPLE 6

Perborate Free Washing Agent

| | |
|---|---|
| Ethoxylated $C_{11}$–$C_{15}$ oxoalcohol (1 mole oxoalcohol + 3 moles ethylene oxide) | *2.0 |
| Ethoxylated $C_{11}$–$C_{15}$ oxoalcohol (1 mole oxoalcohol + 13 moles ethylene oxide) | **5.0 |
| Sodium aluminum silicate prepared according to any one of examples 1 to 4 (dried for 6 hours at 90° C., water content 16.8 weight %) | 40.0 |
| Soda (sodium carbonate) | 15.0 |
| Waterglass ($Na_2O$ . 3 . $3SiO_2$) | 4.0 |
| Carboxymethyl cellulose | 1.5 |
| Optical brightener | 0.2 |
| Sodium sulfate | 23.0 |
| Water | Balance |

*This ingredient can be replaced by the same amount of tallow alcohol + 5 moles of ethylene oxide.
**This ingredient can be replaced by the same amount of tallow alcohol + 14 moles of ethylene oxide.

The washing agent was produced by spraying the ethoxylation product (nonionic surfactant) on the powder particles consisting of the remaining constituents.

POC is a poly (hydroxycarboxylate) prepared by the Cannizzaro reaction of a poly (aldehydrocarboxylate), see Haschke U.S. Pat. No. 3,923,742.

The use of the alkali aluminum silicates of the invention has the advantage that the loading of the environment with phosphate will no longer occur. Eutrophication of the waters, seas and rivers will no longer result to the presently known extent if the molecular sieves of the invention are employed in the washing agent.

Except for replacing of the phosphate by the molecular sieve, the washing agents are the same as those conventionally employed in the art. Thus, there can be used the conventional surfactants or detergents, e.g., anionic, cationic and nonionic detergents. Thus, as detergents there can be used, for example, higher alkyl sulfate detergents, particularly the alkali metal salts of such sulfates, those having 8 to 22 carbon atoms in the alkyl residue such as sodium lauryl sulfate, potassium lauryl sulfate, sodium octadecyl sulfate, sodium coconut fatty alcohol sulfate, sodium octanyl sulfate, sodium alkyl ($C_{14}$–$C_{18}$) sulfate, as well as the corresponding long chain aliphatic sulfonates, e.g., sodium octanyl sulfonate, sodium dodecyl sulfonate, sodium tetradecyl sulfonate, sodium octadecyl sulfonate, potassium dodecyl sulfonate, ammonium dodecyl sulfonate, sodium decyl sulfonate, higher alkyl ether sulfates, higher alkyl glyceryl ether sulfonates, higher alkyl phenol polyethylene oxide sulfates, polyoxyethyl ethers of fatty alcohols, polyethylene oxide condensates with higher alkyl phenols such as isooctyl and nonyl phenol condensed with 3 to 20 moles of ethylene oxide, sodium o-xylene sulfonate, potassium xylene sulfonate, potassium tertiary octylbenzene sulfonate, potassium dodecyl toluene sulfonate, sodium p-xylene sulfonate, sodium propyl naphalene sulfonate, sodium butylnaphthalene sulfonate, lauramidodipropyl dimethyl benzyl ammonium chloride and N-diethylamino oleylamide hydrochloride.

There can also be present conventional additives including bleaching agents; e.g., sodium perborate, water softeners, e.g., borax, as well as other additives including sodium carbonate, sodium sulfate and potassium carbonate, as well as polyvinyl alcohol, carboxymethyl cellulose, etc.

The other materials can be omitted if desired.

The compositions can comprise, consist essentially of, or consist of the materials set forth.

What is claimed is:

1. A process for producing a crystalline zeolitic molecular sieve of Type A with the composition $$1.0 \pm 0.2 \, Na_{2/n}O : Al_2O_3 : 1.85 \pm 0.5 \, SiO_2 . \, y \, H_2O$$

where $y$ has a value up to 6 having particles with at least 99.5 weight % below 30µ diameter, as well as at least 90 weight % under 10µ and with 50 weight % below 6.5µ and having the particle spectrum

| Fraction (µ) | Portion (weight %) |
|---|---|
| <5 | 25–35 |
| <10 | 90–93 |
| <15 | 91–97 |
| <20 | 93–98 | comprising hydrothermally crystallizing a sodium aluminate silicate by pouring together while stirring an aqueous sodium silicate solution and a first aqueous sodium aluminate liquor containing 1 to 100 g $Al_2O_3$/l and 10 to 200 g $Na_2O$/l, allowing the synthesis premixture formed having the molar ratios

| | |
|---|---|
| $SiO_2/Al_2O_3$ | 3.4 to 50:1 |
| $Na_2O/SiO_2$ | 0.2 to 20:1 |
| $H_2O/Na_2O$ | 4 to 300:1 | to solidify to a gel, adding to this gel a second and more highly concentrated aqueous sodium aluminate liquor containing up to 200 g $Al_2O_3$/l and up to 250 g $Na_2O$/l at a temperature between 10° and 100° C while stirring, allowing the thus obtained synthesis mixture to crystallize at a temperature between 20° and 175° C within 15 minutes.

2. The process of claim 1 wherein the crystallization is carried out at about 100° C.

3. The process of claim 1 wherein the crystallization is followed a tempering in the crystallization mother liquor for a time of 0.2 to 6 hours.

4. The process of claim 3 wherein the tempering is carried out at 85° to 105° C.

5. The process of claim 1 wherein the sodium silicate and the first sodium aluminate are reacted in the presence of aqueous sodium hydroxide containing 0.1 to 500 grams of NaOH/l.

6. The process of claim 1 wherein the synthesis premixture molar ratios are $SiO_2/Al_2O_3$ : 3.4 to 40:1
$Na_2O/SiO_2$ : 0.2 to 0.5:1
$H_2O/Na_2O$ : 4 to 200:1

7. The process of claim 1 wherein the more highly concentrated alkali aluminate liquor is a sodium aluminate liquor having from above 100 to 200 grams $Al_2O_3$/l and from above 100 to 250 grams $Na_2O$/l.

8. The process of claim 7 wherein the more highly concentrated sodium aluminate has 100 to 150 grams $Al_2O_3/l$.

9. The process of claim 7 wherein the more highly concentrated sodium aluminate liquor has 111 to 200 grams $Al_2O_3/l$ and from 170 to 250 grams $Na_2O/l$.

10. The process of claim 1 comprising employing shearing forces in at least one of the steps of crystallization and tempering.